Patented Dec. 24, 1940

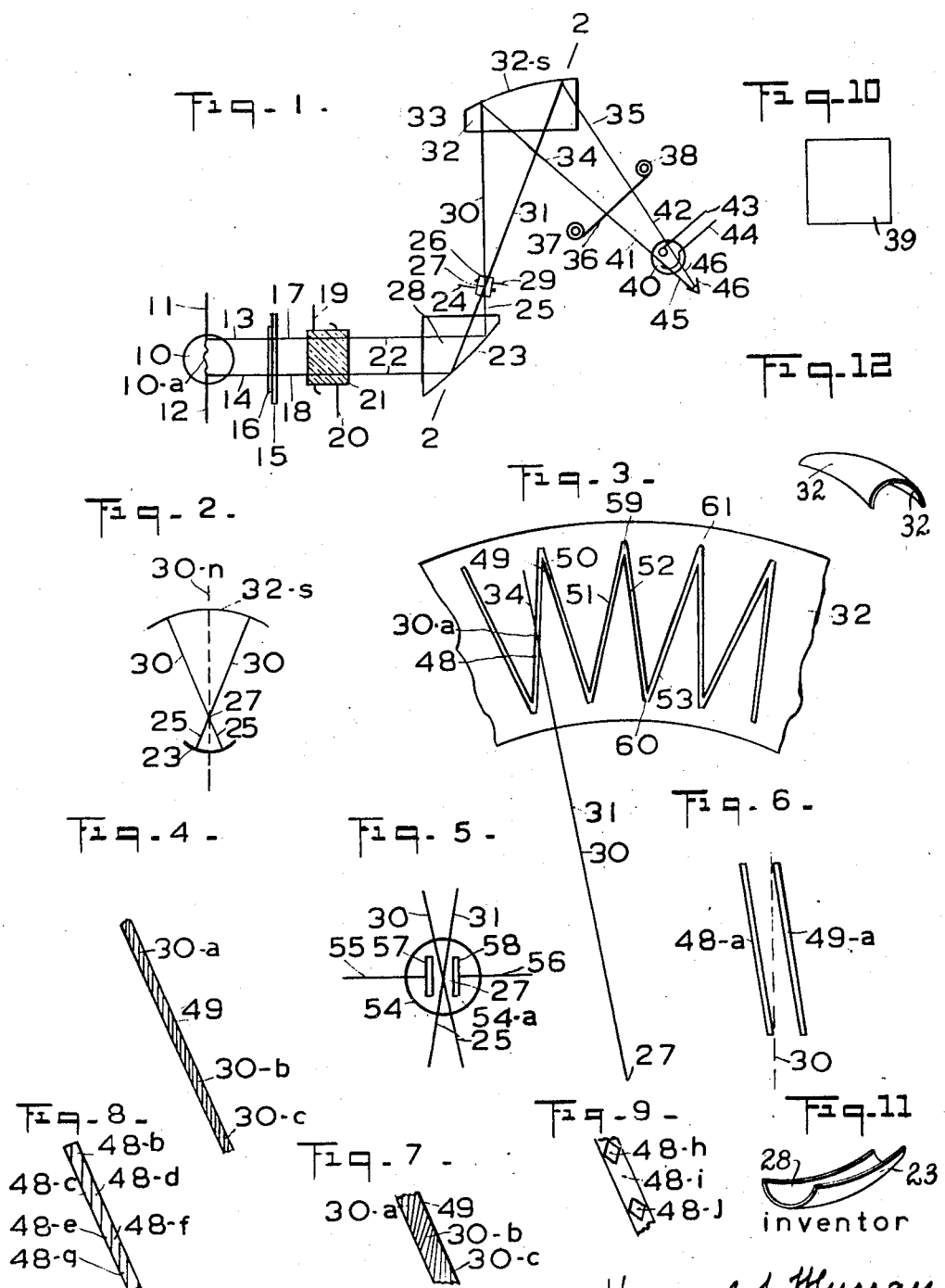

2,225,922

UNITED STATES PATENT OFFICE 2,225,922

LIGHT DECOMPOSING AND ASSEMBLING DEVICE

Howard J. Murray, New York, N. Y.

Application November 20, 1937, Serial No. 175,565

20 Claims. (Cl. 178—7.3)

A general object of the present invention is to provide a high speed television transmitting and receiving device having no moving parts.

One of the objects of the present invention is to provide a device which can be employed to transfer actions of images to a remote place in desired sequence and in proper spaced relation so that the said actions in effect will be collectively visible at the said remote place.

Another object of the present invention is to provide means whereby actions of images can be transferred by the co-operative action of polarized light and a flux field.

Still another object of my invention is to provide means whereby a relatively high frequency current may be produced in definite relation to a relatively low frequency current.

An additional object of the present invention is to provide an image scanning device operated by current at commercial frequencies.

A further object of the present invention is to provide a television receiving device including an image action modulating element operable with a relatively low amount of energy.

A still additional object of my invention is to provide means employing light plane rotation, analysation, reflection, modulation and interception in a definite synchronous manner.

In the following description names will be given to parts for convenience of expression, but the names are intended to be as generic in their application to similar parts as the art will permit. The present disclosure is a further development of the invention disclosed in my U. S. Patent No. 2,169,071 issued Aug. 8, 1939.

The invention allows numerous physical embodiments and two different types are herein illustrated for the purpose of showing the wide application of the invention, but it is understood that the showings in the drawing are largely diagrammatic merely being sufficient in detail to show applications of the invention.

In the drawing:

Figure 1 is a diagrammatic arrangement of the combined transmitting and receiving equipment.

Figure 2 is an oblique sectional elevation taken along the line 2—2 of Figure 1 showing in a more or less diagrammatic manner the relation of the reflecting surfaces to a common axis.

Figure 3 is an enlarged plan view of the micro-reflecting element showing the arrangement in one embodiment of the reflecting surfaces.

Figure 4 is an enlarged plan view of one of the reflecting surfaces of Figure 3.

Figure 5 is a side sectional view of the electro-optical modulating means and its relation to the reflected light portions.

Figure 6 is a modification of the reflecting surface of Figure 3.

Figure 7 is a plan view of a portion of one of the reflecting surfaces of Figure 3 showing the change in the plane rotation of a reflected portion when modulated by image action flux field.

Figure 8 is a perspective view of a portion of one of the reflecting surfaces of revolution of Figure 3.

Figure 9 is a plan view of a portion of a modification of the surface of revolution of Figure 8.

Figure 10 is a graphic presentation of the image screen.

Figure 11 is a graphic presentation of the stationary analyzing element of Figure 1 providing a reflecting surface of revolution.

Figure 12 is a graphic presentation of the stationary micro-analyzing element of Figure 1 providing a micro-reflecting surface of revolution.

Referring now to Figure 1 there is shown a pair of current supply leads 11 and 12 connected to a source of current (not shown) to conduct current to and from a light producing element 10. The light 13—14 is passed through a conventional polarizing film such as "Polaroid" attached to a sheet of glass 15. The film 16 is preferably positioned to polarize the light 13—14 with normal plane polarization parallel to the sheet of paper upon which Figure 1 is drawn. The polarized light 17—18 is passed through the conventional plane rotating medium 21 around which is wrapped a flux producing winding supplied with current by the leads 19 and 20 connected to a conventional source of current (not shown). When varying current is passed through the flux producing winding 19—20 the polarized light 22 transmitted through the plane rotating medium 21 will be plane rotated in synchronisn with the field current variation flowing in the winding 19—20 as is well known and accepted in the magneto-optical art.

A stationary analyzer 23 provided with a curved surface of revolution 28 is positioned in the path of the plane rotated light 22 and is preferably formed with a conical reflecting surface so as to analyze the light 22 according to the angular degree of its plane rotation by reflection thereof. This curved surface of revolution 28 of the analyzer 23 is assumed for the purpose of this description to be a quadric surface of revolution, the generating curve of which is determined by the form of the member 23. Portions of the light 22 will thus be reflected from the surface 28 of element 23 according to the plane rotation in the medium 21. With proper design of analyzer 23 all of the portions of reflected light 25 will be of the same intensity, and will be progressively and sequentially reflected, especially if the field creating current flowing in the leads 19 and 20 is an alternating current of sinusoidal form.

It is assumed that the axis of revolution 27 (see Figure 2) of the curved conical reflecting element 23 of which the reflecting surface 28 is a portion also lies in the normal plane of polarization of the reflected light 25. As long as the plane polarization of the light is normal, it is obvious that a portion of the light 22 will be reflected as portion 30—n (see Figure 2). This is true, because a line portion of the reflecting surface 28 of the element 23 will be at right angles to the plane polarization of the light 22 when said line surface includes the said surface generating curve. The sharpness of the analyzing action of the line surface of the element 23 will be determined by the radius of revolution of the elementary points of the said lines collectively forming the reflecting surface 28 of same. The smaller the radius of revolution (see curve 23 of Fig. 2 the greater the angular change between adjacent line reflecting surfaces sequentially at right angles to the rotated plane polarization of the light 22. The inventive novelty of the present disclosure is found in the method of causing polarized light to be progressively decomposed into elementary portions as a function of its plane rotation into planes at right angles to a plurality of curved line reflecting surfaces collectively forming a surface of revolution. As the plane polarization of the light 22 is rotated out of the normal plane due to the plane rotating action of the flux field created by the current flowing in the winding 19—20 a curved new line reflecting surface will be presented by the element 23 that will also lie at right angles to the new plane polarization (see Fig. 2). As the plane polarization is rotated, a line reflecting surface will be presented for each possible plane rotation of the polarized light 22.

If the rotation of the plane polarization of light 22 is continuous and in accordance with the current variation of the said oscillating field current in the winding 19—20, it is obvious that a continuous succession of right angle line reflecting surfaces must be available and in the path of the light 22 to analyse portions of the said light at all plane rotation angles.

A curved conical surface of revolution as 28 of analyzer 23 is one of the surfaces that will provide these right angle line portions for any given plane rotation of light 22 over a given range of oscillation.

Let it be assumed that the alternating current supplied to the winding 19—20 has a commercial frequency of 60 cycles per second. As each cycle includes two alternations then the light 22 will be plane rotated from the normal plane and back 60 times in each direction, 120 times per second.

The elementary line reflecting portions of the universal analyser surface revolution 28 will reflect such portion of the light 22 as intercepts the elementary line portions with plane rotation at right angles to the said line surface portions. Under normal conditions a sheet of polarized light of constant intensity will be reflected from the surface 28 of the element 23 because the right angle line reflecting surfaces will be of the same area. This reflected sheet of light 25 will oscillate about the axis of the reflecting surface of revolution 28, and this axis includes the focal point 27 (see Figure 2) in accordance with the plane rotation of the light 22 in the medium 21. There will be no variation in the intensity of the reflected sheet of light 25 as long as the source of light 10—a remains at constant intensity. As the plane rotation of the light 22 oscillates in synchronism with the 60 cycle field producing current it is evident that this sheet of light 25 (composed of a progression of elementary portions of the light 22) will in visual effect oscillate 60 times per second about the axis. The actions of the alternating field current in the winding 19—20 are thus visually reproduced in the oscillating sheet of light 25.

In my U. S. Patent No. 2,169,071, I employ a conical reflecting surface with ruled line surfaces symmetrically positioned about a common axis. The reflected light is reflected in parallel lines with this ruled line analyser. In the present disclosure the elementary line reflecting portions are curved, but are symmetrically similar with respect to the common axis 27. In other words, the curved surface of revolution 28 may be generated by rotating one of the curved line reflecting surfaces about the axis as shown in Figure 2. In the embodiment shown by Figure 1 of the present disclosure the elementary line reflecting surfaces of area 28 of member 23 are so curved that the reflected light 25 converges at the focal point 27. As the sheet of analysed and reflected light 25 also oscillates about this point 27 as hereinbefore stated, and the reflected light 25 is in effect focused at the focal point 27 (see Figures 1 and 2.)

A second magneto-optical plane-rotating means is positioned in the path of the reflected light 25 with a plane rotating element 26 and an associated field producing winding 24—29 symmetrically positioned about the point 27 lying in the axis of the said surface of revolution 28. When the element 26 is properly formed the sheet of light 30—31 will in visual effect diverge after passing through the point 27 as shown in Figure 1.

A micro-analyser means 32 is positioned in the path of the diverging light sheet 30—31. This micro-analyser and reflector is formed with a surface of revolution by rotating a generating line about an axis including the focal point 27 (see Figure 2) and is similar to the analyser 23 except that it is larger.

The reflecting surface 32—s includes active line reflecting portions symmetrically positioned about the axis 27 (see Figure 2). The portions include elementary reflecting line areas all forming parts of a surface of revolution. An enlarged plan view of one arrangement of these elementary surfaces of revolution may be seen by reference to Figure 3. The sheet of light 30—31 will be partially reflected if an elementary line analysing surface is presented by the means 32. In Figure 3 these elementary line reflecting surfaces are identified by the numerals 48, 49, 51, 52 and 53. These elementary line surfaces may be curved or straight with reference to the axis 27. If they are straight, the lines 34—35 representing the elementary line reflected light will diverge. If the said elementary line surfaces of analyzer 32 are curved, the lines of elementary portions of reflected light 34—35 may be parallel or converge according to the manner of transmitting the light 22 from the source 10—a. Let it be assumed for the purpose of this description that the surface of revolution of element 32 is formed so that the surfaces 48, 49, 51, 52 and 53 are curved as shown in Figure 1 and that the plane polarizations converge at the eye point 46.

The sheet of light 30—31 is viewed edgewise in Figure 3 and is oscillating about the focal axis 27 (see Fig. 2) in synchronism with the oscillations of the field producing current supplied to the winding 19—20 of Figure 1. Let it be assumed that the sheet 30—31 is moving clockwise about said common axis in synchronism with a positive alternation of the said field producing current in the flux producing winding 19—20. The sheet 30—31 in effect will thus move upward along the surface 48 and thence downward along the surface 49 (see Figure 4) to be sequentially reflected from the elementary line surface portions 30—a, 30—b and 30—c. The parallel elementary reflecting lines 30—a, 30—b and 30—c of Figure 4 represent elementary micro line reflecting portions of the surfaces as 48 and 49 progressively at right angles to the sheet of light 30—31 as it is in effect rotated clockwise about the axis 27 of Fig. 2.

While the said sheet of light 30—31 may appear visually as the same amount of light, actually the sheet 30—31 at any instant is the result of a continuous peeling action. Light portions are being added and removed at the same time and in the same amount, and the resulting light 30—31 is normally the same in intensity and amount as it oscillates visually about the said common axis as a sheet of light. The purpose of the micro-analysing surfaces 30—a, 30—b and 30—c is to magnify the analysing action of the elementary curved line surfaces of the analyzing means identified by the numeral 23. As the sheet 30—31 moves down the surface 49 clockwise, portions of the said sheet will be reflected at the right angle line reflecting surface portions 30—a, 30—b and 30—c.

Portions of the light 30—31 will be progressively and sequentially reflected from all the elementary line reflecting portions 30—a, 30—b and 30—c of the reflecting portions 48, 49, 51, 52 and 53 of the micro-analyser 32. The doubly-reflected elementary light portions 34—35 will appear approximately as a line of light of constant intensity and oscillating with a frequency depending on the number of portions as 48, 49, 51, 52 and 53 sequentially presented during one oscillation of the reflected sheet 30—31. If 1000 of the micro-reflecting surfaces as 49 are formed in the surface of revolution member 32, then the line of light 34 (and 35) will oscillate 2 times, 60 times, 1000, or 120,000 times per second about its focal axis.

But the oscillating sheet 30—31 is now moving clockwise about the axis 27, and thus no two of the elementary micro line reflecting portions 30—a and 30—b will reflect the elementary portions of the sheet of light 34 or 35 to the same focal point during a given oscillation unless the said micro line reflecting surfaces are associated about a common axis of revolution. Whether the successive lines elementary portions of reflected light 34 and 35 diverge, converge or are parallel they will in visual effect be sprayed as a flying spot over the light sensitive surface of the movable photographic film 36 mounted for movement on the rollers 37 and 38 in a conventional manner. The line of light 34 (or 35) will be sprayed in a zig-zag manner according to the arrangement of the elementary reflecting portions 48, 49, 51, 52 and 53 periodically repeated over the surface of the film 36 as a flying spot of light. The periodic repetition of this spraying action will be in synchronism with the oscillations of the current supplied to the flux producing winding 19—20.

If the conventional photographic film 36 is removed from the path of the sprayed light 34—35 and an image screen 39 of Fig. 10 is substituted, the elementary portions of light 34—35 constituting the spray will collectively appear visually as an area of light. The shape and size of the lighted area will depend on the arrangement of the reflecting means 23 and 32 shown in Figure 1.

If the conventional image screen 39 of Fig. 10 is removed from the path of the micro-analyzed light 34—35 and a conventional photo-electric member 49 is positioned to intercept the said flying spot of light, there will be no variation in the current supplied by the leads 43 and 44 because the spray of light is normally of constant intensity and amount.

If the film 36 has been previously exposed to the actions of an image and developed and is now replaced as shown in Figure 1. The finger or stream of reflected light 34—35 will be modulated by the recorded actions of the image as it moves periodically in a zig-zag manner over the active image surface of the film 36. The current in the leads 43 and 44 will now be varied in accordance with these image actions, and current modulated with the actions of the image upon the film 36 may be conducted by the leads 43 and 44 to a remote point and transmitted in any conventional manner to a receiving station.

It will be understood that any known method of scanning an image may be employed in place of the film 36 without departing from the spirit of the present invention.

Now let it be assumed that the means of Figure 1 constitute a receiving station and that the varying image currents produced in the leads 43 and 44 at the transmitting station as hereinbefore described are transmitted in a conventional manner and in effect are delivered to the modulating flux producing winding 24—29.

In this event an image action magnetic field will be created. The plane rotating material 26 constitutes a portion of the flux path of this image field, and the analyzed light 25 passing through the plane rotating material 26 will be additionally plane rotated in accordance with the recorded and transmitted actions of the image on the transmitting station film 36 (assuming the means of Figure 1 are duplicated as hereinbefore stated at a remote point to constitute a transmitting station). The modulating flux path of the winding 24—29 will be much smaller than the flux path of the field produced by the winding 19—20 and consequently a much smaller flux creating current will be required to cause the same angle of plane rotation of the elementary portions of light 25 passing through the point 27 lying in the said common axis. In addition the maximum plane polarization rotation of the light 25 may be the same for all the portions as they are sequentially reflected from one curved line reflecting surface after another, while the plane rotation of the light 22 will be different for each of the portions 25. The exciting current required for the maximum plane rotation modulation of the light portions 25 will be only a fraction of the current required for the maximum plane polarization of the light portions 22. In effect the current in the winding 24—29 acts as a plane rotation modulator. The intensity of the light 30—31 is not changed as its plane polarization is modulated in accordance with the said image actions, but its plane rotation is modulated in accordance with the actions of the said image of the film 36 (when positioned at the transmitting station).

The magneto-optical elements 24—29 and 26 may be removed and replaced by the electro-optical means including the elements 54 to 58 inclusive as shown on Figure 5. When an electric field is varied in accordance with the actions of the image of film 36 the plane polarization will be elliptically rotated in accordance with the said image actions. The means of Figure 5 is normally positioned symmetrical with respect to the focal point 27 lying in the said common axis as shown in Figure 5. The transparent enclosure 54 is filed with a conventional dielectric as usually employed in Kerr cells.

If the sequentially reflected portions of light 30—31 are magneto-optically modulated while passing through the plane modulating medium 26, the plane rotation of the portions arriving at the micro-reflecting surfaces 48, 49, 51, 52 and 53 of Figure 3 will no longer be in the instantaneous plane 30—31 if they are rotatably modulated with the actions of the said image while passing through the medium 26. Consequently the intensity of the reflected light portions 34—35 will be varied in accordance with such modulation. This is true, because the elementary line reflecting portions are stationary and normally at right angles to the plane polarization of the elementary portions of the light 30—31 when not modulated by the said actions while passing through the rotating medium 26. As the plane polarization of light 30—31 rotates out of the normal plane according to its plane modulation, the reflecting action of the elementary line portions of the surfaces as 49 will reflect less and less of the intercepted light 30—31 as shown by the enlarged polarized light 30—31 intercepted as the light portion of the surface 49 of Figure 7. The plane of portion 30—a has not been rotated out of the normal plane polarization. The plane polarization of the polarized light 30—31 intercepted by the portion 30—b has been rotated out of the normal plane, and the light portion 30—c is still in the normal plane polarization.

Thus the portion of the light 30—31 intercepted by the reflecting portion 30—b will not be reflected with the same magneto-optical or electro-optical value as the portion of the light intercepted by the portions 30—a and 30—c and thus will not be reflected with the same intensity as the portions 30—a and 30—b. This is true, because the said line reflecting surfaces of the reflecting portion 49 of Figure 7 will be at right angles to the plane polarization of the elementary light portions 30—a and 30—c but will not be at right angles to the modulated plane polarization of the light portion 30—b. The elementary light portions 30—a, 30—b and 30—c will therefore be reflected as a function of the degree of their plane modulation in accordance with accepted laws of plane polarization reflection in the art of optics.

If the portions 48, 49, 51, 52 and 53 are properly connected at the opposite ends by the reflecting portions as 59, 59 and 61 so that the elementary line portions have a constant reflecting length as 39—a, then the intensity of the micro-reflected portions of light 30—31 with unmodulated plane polarization will be of the same constant amount and intensity.

Let it be assumed that the portions 48, 49, 51, 52 and 53 are of sufficient length at portions 59—60 to permit 1000 distinct reflected light variations due to the additional modulating plane rotation by the magneto-optical or electric-optical means of Figures 1 and 5 during the travel (in visual effect) of the light 30—31 up one portion (49) or down another portion (50). Then 120,000 (1000×120 alternations) times 1000 or 120,000,000 variations would occur per second with 60 cycle exciting current flowing in the winding 19—20. Such speed is based on a 10 inch square picture with lines 100 fine (100 to the inch) and an oscillation current of 120 alternations per second supplied to the leads 19—20. With a 5 inch square picture of lines 100 fine and an alternation of 30 for the current in the leads 19—20, the light 34—35 could be varied 30 times 500 times 500 or 7,500,000 times per second. This is carrier current frequency. The current in the leads 43 and 44 will also be varied at this frequency and additionally varied in intensity according to the actions of the said image 36. If the image screen 39 is substituted for the photo-electric element 40, then the varied light portions 34—35 may be viewed collectively by the eye indicated by the numeral 46 in visual effect to re-assemble the actions of the said image recorded on the film 36.

It should be noted that the additional magnetic or electric plane rotation of the image modulated portions 30—31 act to decrease the intensity of the light when reflected from the micro reflecting line surfaces as portions 34—35 when added or subtracted from the original or normal plane rotation of the light portions 25. The electric rotation would of course be elliptical, but if either said magnetic or electrical modulating means are installed in like kind at both the transmitting and receiving stations, the variations in the transmitting station will be reproduced in the receiving station.

All of the light 25 passes through the focal point 27 and thus the magneto-optical and the electrical or electro-optical elements for modulating the plane polarization of the light 25 may be made very small. The fields will be very small and thus created with little energy. It is within the scope of this invention to directly apply modulated carrier current to the leads of the windings 24—29 and the Kerr cell 54 without rectification because either alternation of a carrier current will act to modulate the elementary light portions 25.

When the arrangement of micro reflecting surfaces 48—a and 49—a shown in Figure 6 is used, the means of Figure 1 may be employed to produce a high frequency current in the leads 43 and 44 in definite angular relation to the low frequency supplied to the leads 19 and 20. If the light 30—31 is permitted to sweep over a surface as 48—a and thence over a surface 49—a variations will occur in the current supplied to the leads 43 and 44. If the surfaces 48—a and 49—a are properly spaced apart so that there is a time interval between the reflection of light by the surface 48—a and the surface 49—a a series of variations will be given to the current in the leads 43 and 44. If there are 500 of the surfaces as 48—a then there will be 120 times 500 or 60,000 variations in the said current. Each one of these 60,000 variations will occur in definite angular (or time) relation to the alternations of the 60 cycle current supplied to the leads 19 and 20. If the surfaces as 48—a are divided into 500 portions and these portions 48—b, 48—d and 48—f are separated by spaces 48—c, 48—e and 48—f as shown in Figure 8 then the photo-electric circuit element 40 will intercept 120 times 500 times 500 or 30,000,000 separate light impulses per second. It is obvious that the current flowing in the leads 43 and 44 would be varied in synchronism with these impulses. Thus the high frequency variations will be produced in the photo-electric circuit 43—44 in definite time relation to the alternations of the relatively low frequency of the current supplied to the winding 19 and 20. Thus the means of Figure 1 may be modified to produce the carrier current frequency light variations in turn modified by the actions of the image on the film 36. In this event one set of means of Fig. 1 minus the film 36 and the modulating means would be employed at the transmitting point to produce the carrier current as hereinbefore described, another set would be employed at the transmitting point to modulate the carrier current with the said image actions and would not include the magneto-optical rotating means or the screen 39. Still another set would be employed at the receiving place to receive said image modulated carrier current and would not necessarily include the photo-electric circuit element 40 but would employ conventional intercepting elements such as the film 36, screen 39 or the eye 46 in the manner of and for the purpose intended. Each of the carrier alternations of the current supplied to the leads 24—29 of the receiving station combination of Figure 1 could be modulated with an image action, or a group of carrier alternations could be modulated with the same image action. Current of the same frequency may be supplied to the sets of leads 19—20 for all station sets. In the same manner a low frequency current may be superimposed on a carrier current and space transmitted, and thus the current supplied to the leads 19 and 20 at both the receiving and transmitting stations, and also the carrier current modulated with the actions will all be in definite relation to insure faithful reproduction of the image.

The form of the carrier current produced by the varied current in the leads 43 and 44 as hereinbefore described can be in turn varied by varying the form and area of the reflecting area portions 48—c, 48—e and 48—g of Figure 8 as is shown in Figure 9 as portions 48—h, 48—i and 48—j. The reflecting diagonals 48—h and 48—j are spaced apart a distance 48—i. The light reflection will gradually increase in amount as the light portions 30 move clockwise from one side of the diagonal area as 48—h to the other, and then decrease as it passes the greatest width toward the other point.

It is obvious that many areas of different forms as 48—h and 48—j may be provided to cause as many different impulses of varying intensity light to be reflected from same.

It will be obvious to those skilled in the magneto-optical, electro-optical and electrical arts that many well known and conventional elements can be added to the means shown in the drawing to affect the light and the current. I refer to such elements as conventional rheostats, lenses, condensers, color screens, cooling elements and sources of light. Many of these conventional elements could have been included in the disclosure, but I have eliminated all of them in order to keep the drawing as simple as possible.

Therefore, while I have shown and described and have pointed out in the annexed claims, certain novel features of the present invention, it will be understood that various omissions, substitutions and changes in the form and details of the devices illustrated or in its operation may be made by those skilled in the above noted arts without departing from the spirit of the invention.

Having thus described my invention, I claim:

1. In a device of the class described, magneto-optical means including elements for producing a beam of polarized plane rotated light, means providing a curved surface of revolution for reflecting portions of the light according to the rotation further magneto-optical means including elements for causing additional rotation of the plane polarization of the reflected portions according to the actions of an image, and still further means providing a plurality of curved reflecting surfaces positioned in the path of the reflected and additionally rotated each forming a portion of a surface of revolution for additionally reflecting the portions according to the double rotation.

2. In a device of the class described, means for producing plane rotated polarized light, multi-curved reflecting means for reflecting the light in portions according to the said rotation, means providing an image modulated flux field for additionally rotating the plane polarization of the reflected portions, and further multi-curved reflecting means for additionally reflecting the doubly rotated portions in a sequential manner according to the double rotation.

3. In a device of the class described, means for producing plane rotated polarized light, reflecting means providing a parabolic surface of revolution for analysing portions of the light according to said rotation, magneto-optical means for additionally rotating the plane polarization of each of the portions as they are analysed, and further reflecting means providing elementary portions of a surface of revolution for additionally analysing the portions in accordance with the additional plane rotation.

4. In a device of the class described, means for producing a beam of polarized plane rotated light, means including a reflecting surface of revolution formed and positioned to reflect a portion of the plane rotated light according to the plane rotation thereof, electro-optical means for additionally rotating the plane polarization of the reflected portion in accordance with a visual action of an image, and further means including a second surface of revolution formed with a plurality of separated reflecting portions and positioned to reflect the additionally rotated portion in accordance with the said visual action, both of said surfaces curved in two directions.

5. In a device of the class described, means constituting a source of plane rotated polarized light, means including a first group of segments of parabolic reflecting surfaces collectively constituting a continuous surface of revolution and a second set of segments of parabolic reflecting surfaces constituting an interrupted surface of revolution and each means including said reflecting portions symmetrically positioned about a common axis in the path of the light, and further magneto-optical plane polarization rotating means positioned in the path of the light between the group and the set.

6. In a device of the class described, means for producing plane rotated polarized light, and means providing a plurality of separate reflecting surfaces co-operatively associated in the path of the polarized light to reflect portions of the light according to the said rotation, said surfaces positioned about a common axis and each forming a portion of a curved quadric surface of revolution.

7. In a device of the class described, means for producing plane rotated polarized light, and stationary optical means including a plurality of co-operatively associated reflecting surfaces each forming a portion of a surface of revolution positioned one after the other in the path of the rotated light to analyse the light into elementary portions according to the said rotation, said surfaces curved in more than one direction.

8. The method of employing plane rotated polarized light for transferring visual actions of an image into corresponding electric currents which consists in providing the plane rotated light, reflecting portions of the light from a surface of revolution according to the rotation thereof, varying the intensity of the reflected portions by a second reflection according to the actions, and photo-electrically intercepting the varied portions.

9. The method of decomposing a beam of plane rotated polarized light into elementary portions and thence assembling the portions which consists in producing the plane rotated light, doubly reflecting the portions from surfaces of revolution curved in two directions according to the rotation, and intercepting the reflected portions so as to cause the portions to become collectively visible.

10. The method of assembling the actions of an image which consists in providing plane rotated polarized light, reflecting portions of the light from portions of a segment of a parabolic surface of revolution according to the rotation, modulating the reflected portions with the actions, and intercepting the modulated portions so as to cause same to become collectively visible.

11. In a device of the class described, means providing polarized plane rotated light, means providing a multi-curved surface of revolution for initially reflecting portions of the light according to the individual rotation thereof, magneto-optical means for individually rotating the plane polarization of the reflected portions in accordance with the actions of an image, further means providing portions of a curved surface of revolution for additionally reflecting the image action affected portions according to the additional plane rotation, and image screen means for intercepting the twice reflected portions.

12. In a device for assembling the visual actions of an image, means including a parabolic surface of revolution for providing plane rotated polarized light, means for reflecting portions of the light as a function of the said rotation, magneto-optical means in the path of the reflected portions for modulating the plane polarization thereof according to the actions, means including a second surface of revolution for sequentially reflecting the said modulated portions as a function of the modulation and rotation thereof, and light sensitive means for intercepting the twice reflected portions to cause same to become collectively recorded.

13. The method of decomposing a beam of polarized plane rotated light which consists in producing the plane rotated light, and thence twice reflecting portions of the beam from surfaces constituting paraboloids of revolution in accordance with the rotation.

14. The method of employing plane rotated polarized light for decomposing actions of images and thence reassembling the actions of same which includes producing the plane rotated light from a parabolic surface of revolution, reflecting portions of the light according to the said rotation, modulating the plane polarization of the reflected portions in accordance with the image actions, further reflecting the image modulated portions from micro areas of a surface of revolution according to the modulation thereof, photoelectrically varying electric current with the further reflected portions, remotely producing additional similarly plane rotated polarized light, reflecting portions of the additional light from a stationary surface of revolution similar to the said first named surface in accordance with the rotation thereof, additionally rotating the reflected light portions in accordance with the image modulated current, reflecting the modulated portions from micro areas of a stationary surface of revolution similar to the first named micro areas in accordance with the modulations thereof, and thence intercepting the twice reflected portions so as to cause same to become collectively visible so as to reproduce the said actions.

15. In a device of the class described, magneto-optical means including elements for producing polarized plane rotated light, optical means including a paraboloid reflecting surface of revolution for reflecting portions of the light in accordance with the plane rotation thereof, magneto-optical means for further rotating the individual plane polarization of the reflected portions, further optical means including a second paraboloid reflecting surface of revolution for additionally reflecting the additionally plane rotated portions, photo-electric means positioned for transferring the additionally reflected and plane rotated light portions into corresponding electric currents, and circuit means for conducting the said currents to an external circuit.

16. In television, magneto-optical means for producing polarized plane rotated light, stationary optical means providing a surface curved in a plurality of directions for reflecting portions of the light as a function of the said plane rotation, further stationary magneto-optical means for additionally rotating the plane polarization of the reflected portions according to the actions of an image, still further stationary optical means providing portions of a curved surface of revolution for reflecting portions of the initially reflected portions in accordance with the combined initial and additional rotation thereof, image means for additionally modulating the sequentially reflected portions of the initially modulated portions, image screen means for intercepting the doubly modulated portions, photo-electric circuit means positioned to intercept the modulated portions upon removal of the image screen means, and circuit means for conducting the photo-electric current to an external circuit.

17. In a device of the class described, means for producing polarized plane rotated light, means for providing a parabolic surface of revolution for initially reflecting portions of the light as a function of the rotation of same, stationary electro-optical means for additionally rotating the plane polarization of each of the reflected portions in accordance with the actions of an image, further stationary means including a plurality of reflecting surfaces forming portions of a second parabolic surface of revolution symmetrically positioned about a common axis for additionally reflecting in a progressive manner the additionally rotated portions in accordance with the total initial and additional individual plane rotation thereof, and means constituting an image screen for intercepting the twice reflected portions thereby to cause same to be viewed collectively.

18. The method of employing polarized plane rotated light for transferring visual actions of images from one place to another place which includes producing the plane rotated light sequentially from similar parabolic surfaces of revolution, doubly reflecting portions of the light in accordance with the individual plane rotation thereof, sequentially modulating the reflected portions with the actions between reflections, photo-electrically intercepting the modulated portions, and conducting the resulting currents to another place.

19. In a frequency changing device, means for producing plane rotated light, means providing portions of a stationary curved surface for sequentially reflecting portions of the light according to the rotation and at intervals relative thereto, photo-electric means positioned to intercept the interval reflected portions to vary current at the reflected frequency interval, and circuit means for conducting said varied current to an external circuit.

20. The method of providing a high frequency current in definite relation to a low frequency current which includes providing polarized light plane rotated at the low frequency, reflecting portions of the light from portions of a curved interrupted reflecting surface at a high frequency according to the plane rotation of same, and intercepting the portions reflected thereby to vary current at the reflected high frequency.

HOWARD J. MURRAY.